(12) United States Patent
Arnold et al.

(10) Patent No.: US 6,233,093 B1
(45) Date of Patent: May 15, 2001

(54) TEMPERATURE CONTROL FOR MICROSCOPY

(75) Inventors: William Allen Arnold, Akron; Perry Marteny, Stow; Angela Marie Marcelli, North Canton, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/508,655

(22) PCT Filed: Nov. 25, 1997

(86) PCT No.: PCT/US97/22513

§ 371 Date: Mar. 13, 2000

§ 102(e) Date: Mar. 13, 2000

(87) PCT Pub. No.: WO99/27407

PCT Pub. Date: Jun. 3, 1999

(51) Int. Cl.$^7$ .............................. G02B 21/26; G02B 21/00
(52) U.S. Cl. ...................... 359/395; 359/368; 359/391
(58) Field of Search ..................... 359/391–398; 219/200–201, 385–387; 435/286.1; 165/263

(56) References Cited

U.S. PATENT DOCUMENTS

| | | | | |
|---|---|---|---|---|
| 3,472,726 | * | 10/1969 | Scheidegger | 359/395 |
| 4,845,426 | * | 7/1989 | Nolan et al. | 324/158 |
| 5,181,382 | * | 1/1993 | Middlebrook | 359/395 |
| 5,217,608 | * | 6/1993 | Conway | 210/198.2 |
| 5,257,128 | | 10/1993 | Diller et al. | 359/395 |

FOREIGN PATENT DOCUMENTS

| | | | | |
|---|---|---|---|---|
| 504783 | * | 8/1954 | (CA) | 359/395 |
| 4-37811 | * | 2/1992 | (JP) | 359/395 |

OTHER PUBLICATIONS

R J Miller et al: "A Computer Interfaced High–Stability Temperature Controller and Heating Stage for Optical Microscopy" Measurement Science and Technology, vol. 5, No. 8, Aug. 1, 1994, pp. 904–911.

Patent Abstracts of Japan, vol. 009, No. 090, Apr. 19, 1985 & JP 59 218417A (Oosaka Sanso Kogyo KK), Dec. 8, 1984.

D R Lide: "CRC Handbook of Chemistry and Physics, Ready–reference book of chemical and physical data" 1996, CRC Press, pp. 12–179.

* cited by examiner

Primary Examiner—Thong Nguyen
(74) Attorney, Agent, or Firm—David E. Wheeler

(57) ABSTRACT

A temperature control unit provides means for observing samples under microscopy at greatly elevated and greatly reduced temperatures. The temperature control unit is constructed to insulate a sample from ambient temperatures while providing a highly heat conductive substrate for the sample that provides for rapid heat transfer to/from the sample. A dry gas provided a positive pressure around the sample, as compared to atmospheric pressure to help prevent atmospheric contract with the sample.

22 Claims, 4 Drawing Sheets

TEMPERATURE CONTROL FOR MICROSCOPY

BACKGROUND OF THE INVENTION

Those skilled in the materials art recognize that most materials exhibit different properties at different temperatures. A comparison of observable properties of materials at different temperatures may provide valuable information about how materials perform in a product at different temperatures. The present invention is directed to an apparatus and a method whereby such materials may be observed at different temperatures using microscopy, such as atomic force microscopy (afm), as well as light microscopy.

SUMMARY OF THE INVENTION

An apparatus (10) for controlling the temperature of a microscopy sample comprises an external housing (20) made of a highly heat insulating material, an internal housing (22) made of a highly heat conducting material within said external housing for holding a sample to be subjected to microscopy, and conduit means (28, 28a) for the flow of a temperature controlling gas (16a) through said external and internal housings, and chamber means (44) with vent holes (26b) for directing the flow of the temperature controlling gas (16a) around the sample.

A thermocouple (32) is associated with the sample for measuring the temperature of the sample. Also, heater (36) may be associated with the sample for heating the sample, and heaters (30,34) may be located in the internal and external housings for heating the temperature controlling gas. Also, cooling means (26) are provided for reducing the temperature of the temperature controlling gas (16a).

The internal and external housings are made of materials that have specific heat conducting properties designed to optimize temperature control and minimize temperature fluctuation of the sample. The external housing is made of a material and construction having heat conductivity in the range of 0.00001 to 0.25 W/m-K (watt per meter Kelvin), and the internal housing is made of a material having a heat conductivity in the range of 20 to 2000 W/m-K.

In an illustrated embodiment the exterior housing (20) is made of polyvinyl chloride (PVC) and the internal housing (22) is made of aluminum.

The temperature of the sample can be maintained at −270° C. to 200° C.

The sample is mounted on a sample holder (24) made of highly thermally conductive material and a thermocouple (32) is mounted in the proximity of the sample and the sample holder (24).

A computer can be used for monitoring the temperature of the sample, and controlling the flow of the temperature controlling gas, as well as any heaters that may be used in the apparatus, to maintain the temperature at a constant level.

DETAILED DESCRIPTION OF THE INVENTION

Figure 1:
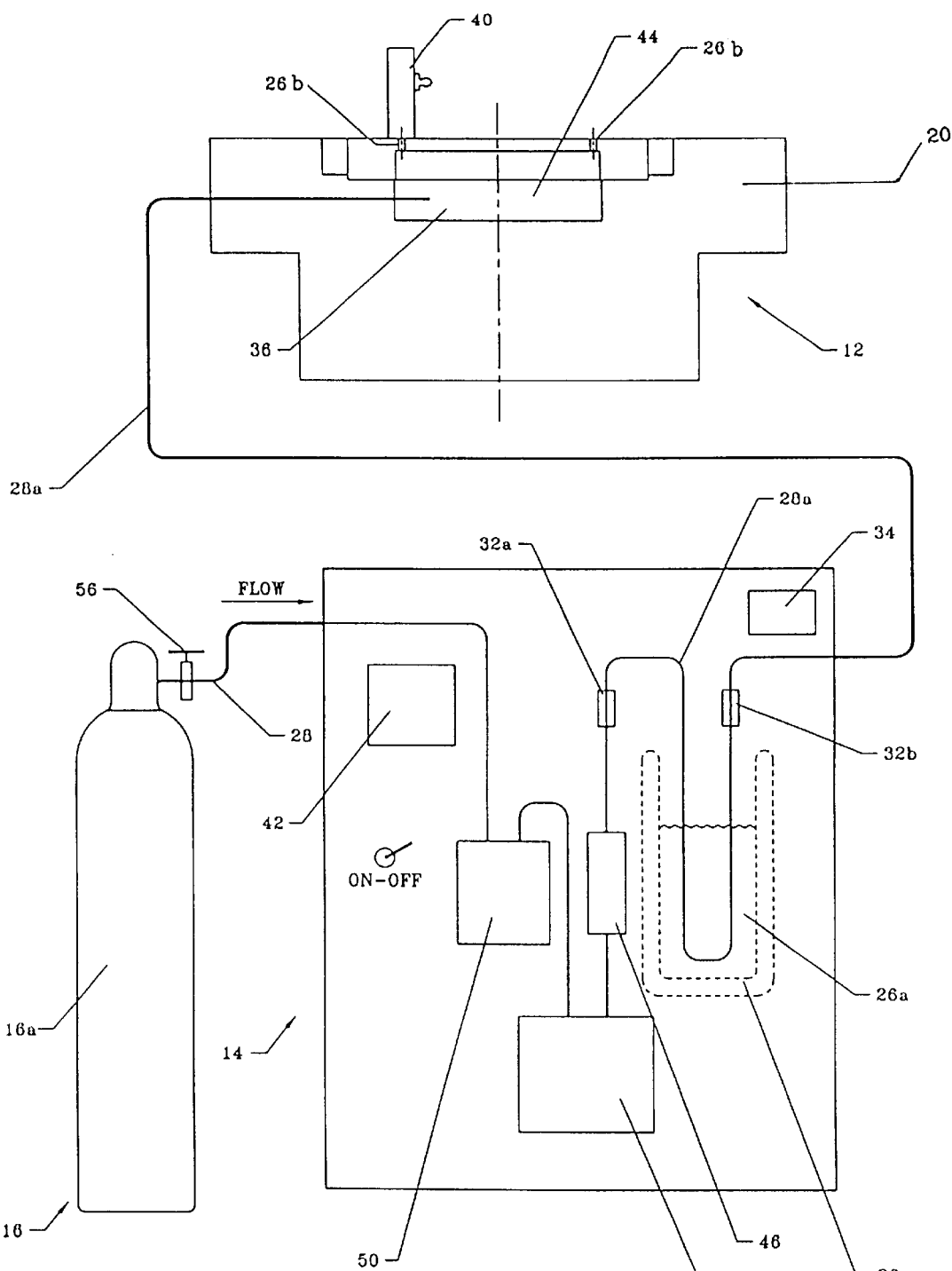
FIG. 1 illustrates one possible embodiment of the temperature control apparatus of the invention.

With reference now to FIG. 1, an illustrated variable temperature controll device (10) of the invention includes a sample holding portion (12), temperature control center (14), and fluid source (16).

Figure 2:
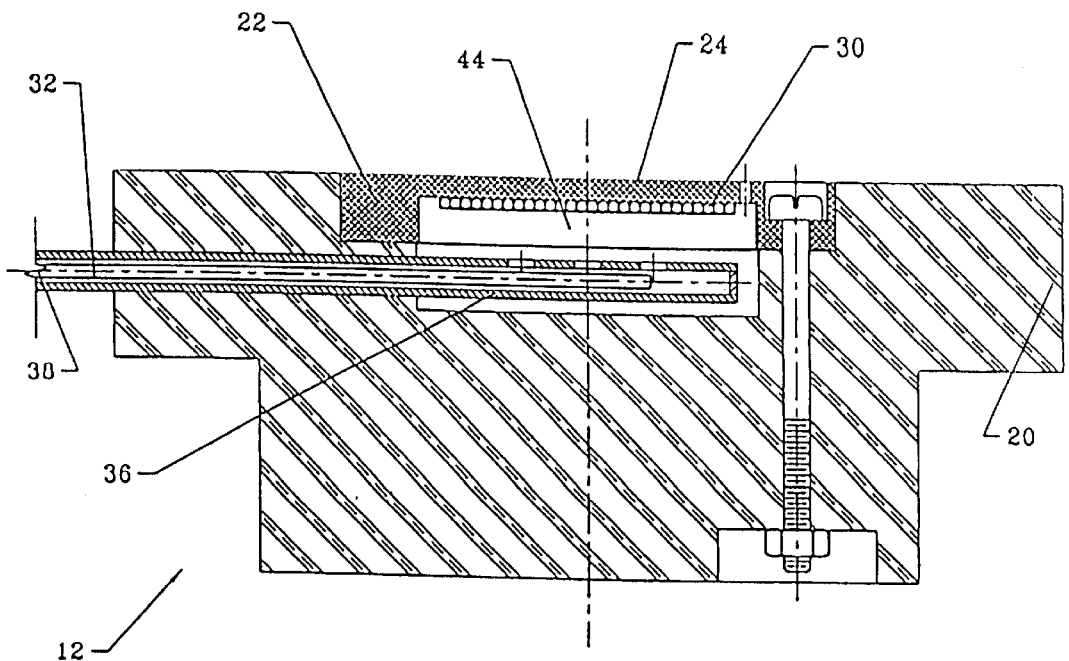
FIG. 2 illustrates a side view of a housing of a temperature control apparatus of the invention.
Figure 3:
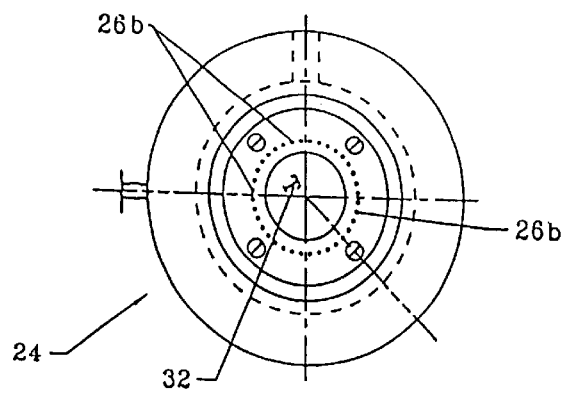
FIG. 3 illustrates a top view of the housing illustrated in FIG. 2.

With reference as well to FIGS. 2 and 3, sample holding portion (12) comprises an exterior housing (20) made of a highly heat insulating material and construction having a heat conductivity of 0.00001 to 0.25, preferably 0.02 to 0.15 W/m-K (watt per meter Kelvin), and an interior housing (22) made of a low heat insulating material having a heat conductivity of 20 to 2000, preferably 50 to 400 W/m-K, and sample holder (24).

Examples of highly heat insulating materials used to make exterior housing (20) are polyvinyl chloride (PVC), celluloid, particle board, cork, and foamed polyurethane. Examples of low heat insulating material used to make the interior housing (22) are aluminum, copper, carbon steel, pyrolytic graphite, gold and brass.

A highly heat insulating material is used to make outer housing (20) to help prevent heat transfer to or from external housing (20) to the surroundings, which saves energy and helps maintain a constant temperature within external housing (20) with little or no fluctuation. The low heat insulating material (i.e., highly heat conductive material) used to make internal housing (22) aids in quickly drawing heat from or transferring heat to the sample so that a substantially constant sample temperature can be quickly achieved and maintained using the temperature control devices associated with temperature control center (14).

The construction of external housing (20) may enhance the insulating effect of the material used to make the housing. For example, if a material having a heat conductivity outside the range described above is used, and the material is used to make a double walled exterior housing, the effective insulating properties of the exterior housing may be in the range described, even though the material used has properties outside the range.

The temperature at which a sample is maintained during microscopy may also have some bearing on the materials chosen for fabricating the temperature control device of the invention. For example, if samples are maintained at 200° C., PVC may soften and break down, and coated cork or particle board may be performed for making exterior housing (20). Other material substitutions will be apparent to those skilled in the art.

In the illustrated embodiment, temperature control is achieved using computer balancing temperature raising and lowering devices. When low temperatures are desired, fluid (16a), such as nitrogen (N$_2$) gas, is passed through cooling means (26a) in refrigeration means (26). Cooling means (26a) can conveniently be a liquefied or solidified gas, such as N$_2$, CO$_2$, He, or Ar. Those skilled in the art will recognize that mechanical refrigeration can be used for cooling means (26a), especially if only mild cooling is needed.

When higher temperature are desired, heaters (30,34,36) may be employed to raise the temperature of temperature controlling fluid (16a).

When pressurized gas is used as the temperature controlling fluid (16a), the flow of the gas is controlled by pressure control valve (56), flow regulating solenoid valve (50), and flow buffer (48). Flow buffer (48) provides a reservoir for compression and expansion of the gas to help smooth out the gas flow since solenoid valve (50) operates only to turn on and turn off the flow of the gas.

A pressure of 5 to 30 psi (pounds per square inch) for the temperature controlling gas in the system is desirable, and pressures in the lower end of the range are preferred.

The controlled flow of fluid then passes through refrigerator means (26). If cooling is desired, the gas flows through cooling means (26a) and exits refrigeration means (26) through tubing (28a). Optimally heater (34) may be placed adjacent tubing (28a) downstream of refrigeration means (26), and optional thermocouple (32b) may be placed in tubing (27a) in the proximity of heater (34).

Additional thermocouples may be provided, for example thermocouple (32a) in temperature control unit (1A), in the path of temperature controlling fluid (16a) as desired.

The temperature of the fluid (16a) can be controlled somewhat by the choice of cooling means (26a) and by the amount of time fluid (16a) spends in cooling means (26a), such time being dependant on the flow rate of fluid (16a) and the amount of tubing (28a) passing through cooling means (26a). Heaters (30,34,36), in temperature control center (14), external housing (20), and internal housing (22) may be used in connection with cooling means (26a) to precisely control the temperature of fluid (16a). The temperature of fluid (16a) may be monitored thermocouples (32, 32a, 32b). The heaters (30,34,36), and fluid flow regular (50), may be controlled by computer (42), and optionally other computers, in response to input received from thermocouples (32,32a,32b) and flow meter (46).

If different thermocouples are used in different portions of the apparatus, separate computers may be required to handle the information gathered from each thermocouple.

In the illustrated embodiment, ANSI tyep T sub miniature thermocouples, available from Omega Engineering, Inc, Stamford, Conn. were used.

In the illustrated embodiment, nitrogen is used as temperature controlling fluid (16a), and the nitrogen is passed from tank (16) through tubing (28) into tubing (28a) which passes through refrigeration means (26). Tubing (28) can be a polymer such as rubber or polypropylene or the like, or a metal such as copper. Tubing (28a) is a material which can withstand very low temperatures that may potentially be encountered in refrigeration means (26), and is preferably a metal such as copper.

Refrigeration means (26) may be mechanical refrigeration means known in the art, or it may simply be an insulating double walled container, known as a Dewar flask, used to contain liquefied gases, or solidified gases or liquids.

In the illustrated embodiment, liquid nitrogen is used in a Dewar flask as the refrigeration means (26) for controlling the temperature of fluid (16a).

From temperature control unit (14), temperature controlling fluid (16a) is directed into exterior housing (20), in the illustrated embodiment through conduit (38), over second optional heater (36), and into chamber (44). Chamber (44) serves to stabilize the temperature around the sample by collecting a quantity of the temperature controlling fluid at the desired temperature. A third optional heater (30) may be located directly adjacent sample holder (24).

When microscopy at very low temperatures is desired, atmospheric air must be kept away from the sample to prevent icing or frosting of the sample from atmospheric moisture. To help maintain an envelope of dry fluid around the sample, means for creating a chamber above the sample may be provided, or an optional flow tube (40) may be provided above the sample to direct additional dry fluid over the top of the sample.

In the illustrated embodiment, vent holes (26b) in sample holder (24) (a portion of internal housing (22)) permit temperature controlling fluid (16a) to flow out of chamber (44) around the sample, controlling the temperature of the sample and enveloping the sample in dry fluid which forces atmospheric moisture away from the sample.

Figure 4:
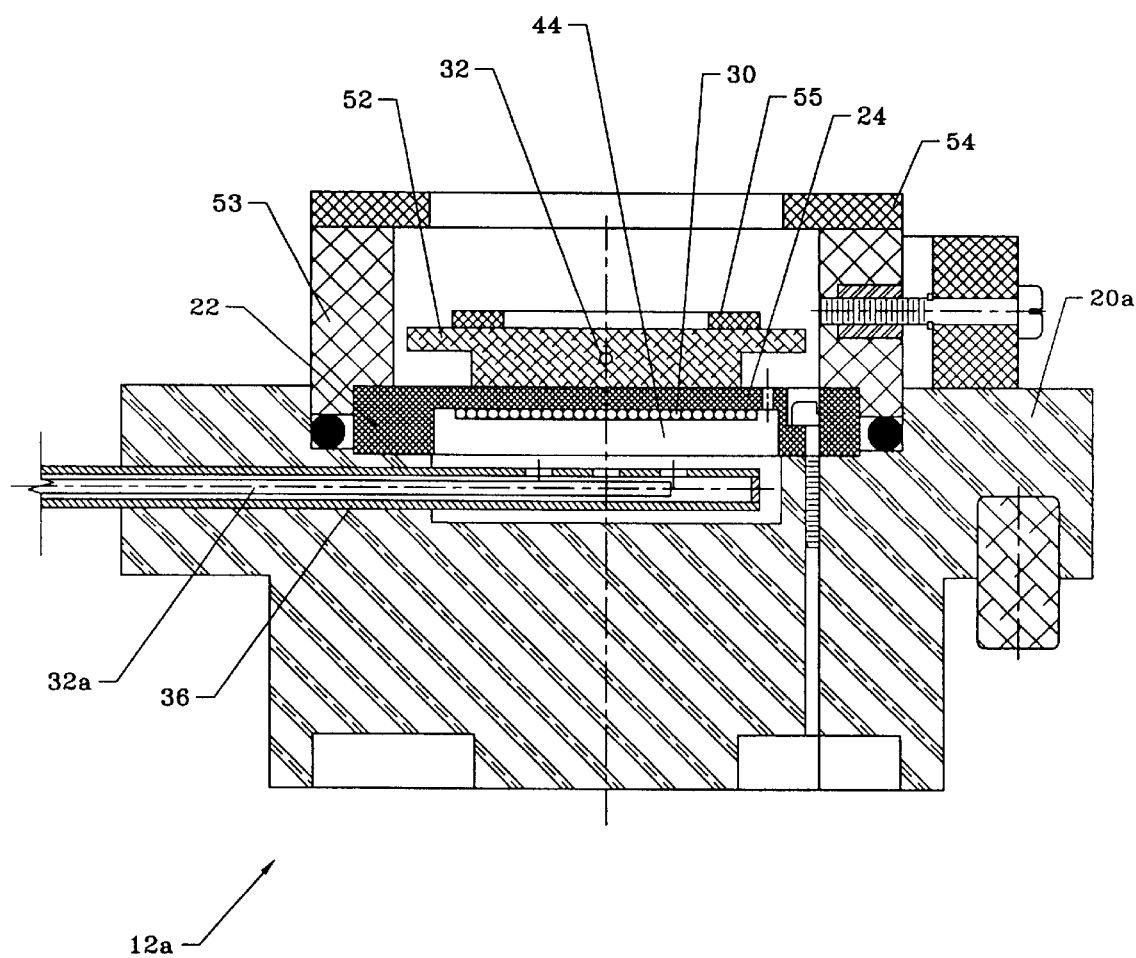
FIG. 4 illustrates a preferred embodiment of a housing for temperature control of a sample.
Figure 5:
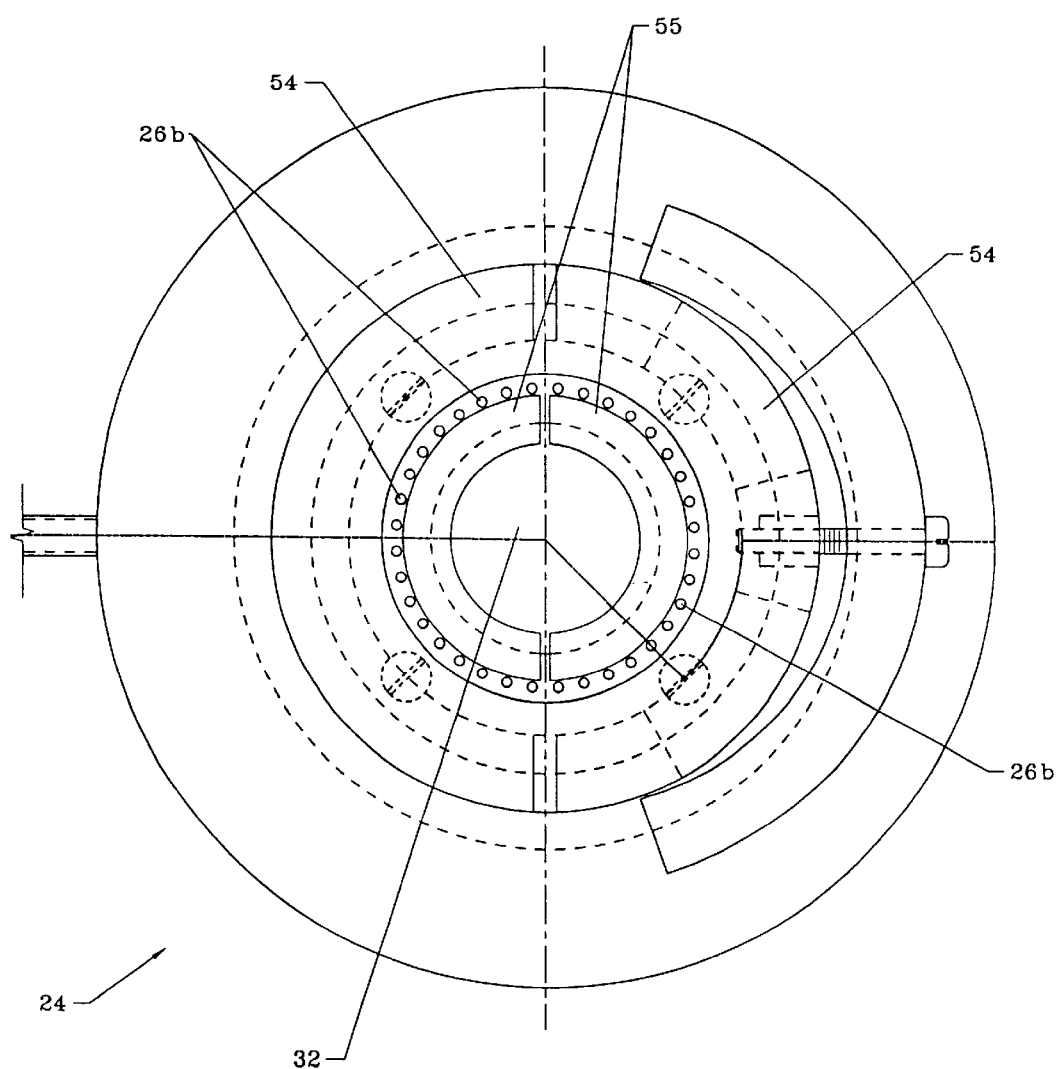
FIG. 5 illustrates a top view of a sample holder of the housing of FIG. 4.

With reference now to FIGS. 4 and 5, in a preferred embodiment of the invention, housing (12a) comprises exterior housing 20a similar to that described in FIG. 2, with an interior housing (22) which is substantially the same as that described in FIG. 2. Housing (12a) also comprises, however, deflector (52) contained within insulated ring (53). Deflector (52) rests over sample holder (24) and creates a protective area around the sample that reduces the exposure of the sample to the atmosphere.

In the illustrated embodiment of FIG. 4, vents (26b) were found to be sufficient to keep moisture away from the sample when baffles (54) were placed over deflector (52) to help control the flow of fluid away from sample (55). In the illustrated embodiment, baffles (54) comprise flat, semi circular pieces of plastic, for example polycarbonate, which are designated to fit on the top of insulated ring (53) to enclose a circle. The sample is accessible by the head of atomic force microscope, or other microscope, through the center of the circle formed by the semi circular pieces, and the temperature controlling fluid escapes through the center of the circle, creating a positive pressure over the sample, as compared to atmospheric pressure, that prevents atmospheric moisture from entering the deflector and reaching the sample.

Those skilled in the art will recognize other means that may be used to keep moisture away from the sample.

Thermocouple (32) is provided adjacent to the sample to help monitor the temperature of the sample.

Computer (42), and optionally other computers, may be provided to accept input from the various thermocouples used in the apparatus, and use the data collected to control the various heaters, the flow rate of temperature controlling fluid (16a), and the refrigeration means (26) to control the temperature automatically.

In the illustrated embodiment, the liquid nitrogen used for the cooling means (26a) in refrigeration means (26) has a boiling point of −196° C., and a temperature of −100° C.±0.4° C. was achieved when a PVC external housing (20) and aluminum inner housing (22) were used. It is believed that lower temperatures can be achieved, but this was left to further experimentation since the durability of the head of the afm microscope (used in this experiment) at low temperatures is not known at this time. It was found that temperatures could be maintained without using heaters (30,34,36) for this test, but it is believed that heaters (30,34,36) will have utility in other applications.

While the invention has been specifically illustrated and described, those skilled in the art will recognize that the invention may be variously modified and practiced without departing from the spirit of the invention. The invention is limited only by the following claims.

What is claimed is:

1. An apparatus for controlling temperature of a microscopy sample (55) comprising an external housing (20) made of a highly heat insulating material, an internal housing (22) made of a highly heat conducting material within said external housing for holding a sample to be subjected to microscopy, conduit means (28,28a) for flow of temperature controlling gas to said external and internal housings, and sample holder (24) as a top portion of internal housing (22) encompassing chamber means (44) within said internal housing (22), sample holder (24) having vent holes (26b) for directing the flow of said temperature controlling gas (16a) around said sample while the sample is on sample holder (24).

2. The apparatus of claim 1 further comprising a thermocouple (32) associated with said sample for measuring the temperature of said sample.

3. The apparatus of claim 2 further comprising a heater (36) associated with said sample for heating said sample.

4. The apparatus of claim 3 further comprising heaters (30,34) contained in said external and interior housings for heating said temperature controlling gas (16a).

5. The apparatus of claim 4 further comprising a computer (42) for monitoring the temperature of the sample (55) and controlling the flow of the temperature controlling gas (16a) and the output of the heaters (30,34,36) to maintain the temperature at a constant level.

6. The apparatus of claim 2 wherein said sample (55) is mounted on a sample holder (24) made of highly thermally conductive material and said thermocouple (32) is mounted between said sample and said sample holder.

7. The apparatus of claim 1 further comprising cooling means (26a) for reducing the temperature of said temperature controlling gas (16a).

8. The apparatus of claim 1 wherein said exterior housing (20) is made of polyvinyl chloride (PVC).

9. The apparatus of claim 1 wherein said internal housing (22) is made of aluminum.

10. The apparatus of claim 1 wherein the temperature of said sample (55) can be maintained at −270° C. to 200° C.

11. The apparatus of claim 1 further comprising a computer (42) for monitoring the temperature of the sample (55) and controlling the flow of the temperature controlling gas (16a) to maintain the temperature at a constant level.

12. The apparatus of claim 1 wherein said exterior housing (20) has a heat conductivity of 0.00001 to 0.25 W/m-K.

13. The apparatus of claim 1 wherein said exterior housing (20) comprises a material selected from the group consisting of polyvinylchloride, cellulite, cork, particle board, and foamed polyurethane.

14. The apparatus of claim 1 whwrein said interior hoising (22) has a heat conductivty of 20 to 2000 W/m-K.

15. The apparatus of claim 1 wherein said interior housing (22) comprises a material selected from the group consisting of aluminum, carbon steel, pyrloytic graphite, gold and brass.

16. The apparatus of claim 1 wherein cooling means (26) comprises liquefied or solidified $N_2$, $CO_2$, He, or Ar.

17. An apparatus for controlling temperature of a microscopy sample (55) comprising an external housing (20a) made of a highly heat insulating material, an internal housing (22) made of a highly heat conducting material within said external housing for holding a sample to be subjected to microscopy, conduit means (28,28a) for flow of a temperature controlling gas to said external and internal housings, and sample holder (24) as a top portion of internal housing (22) encompassing chamber means (44) within said internal housing (22), sample holder (24) having vent holes (26b) for directing the flow of said temperature controlling gas (16a) around same sample while the sample is on sample holder (24), an insulated ring (53), a deflector (52), and baffles (54) for partially enclosing said sample.

18. The apparatus of claim 17 further comprising a heater (36) associated with said sample for heating said sample.

19. The apparatus of claim 17 further comprising heaters (30,34) contained in said external and interior housings for heating said temperature controlling gas (16a).

20. The apparatus of claim 17 further comprising cooling means (26a) for reducing the temperature of said temperature controlling gas (16a).

21. The apparatus of claim 17 wherein said sample (55) is mounted on a sample holder (24) made of highly thermally conductive material and a thermocouple (32) is mounted between said sample and said sample holder.

22. The apparatus of claim 17 further comprising a computer (42) for monitoring the temperature of the sample (55) and controlling the flow of the temperature controlling gas (16a) and the output of the heaters (30,34,36) to maintain the temperature at a constant level.

* * * * *